US012568080B2

(12) United States Patent
Lu

(10) Patent No.: US 12,568,080 B2
(45) Date of Patent: Mar. 3, 2026

(54) APPLICATION RUNNING METHOD AND ELECTRONIC DEVICE

(71) Applicant: HONOR DEVICE CO., LTD., Shenzhen (CN)

(72) Inventor: Caixia Lu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 260 days.

(21) Appl. No.: 18/031,451

(22) PCT Filed: Sep. 9, 2022

(86) PCT No.: PCT/CN2022/118130
§ 371 (c)(1),
(2) Date: Apr. 12, 2023

(87) PCT Pub. No.: WO2023/103499
PCT Pub. Date: Jun. 15, 2023

(65) Prior Publication Data
US 2024/0195805 A1 Jun. 13, 2024

(30) Foreign Application Priority Data

Dec. 7, 2021 (CN) .......................... 202111485506.2

(51) Int. Cl.
*H04L 9/00* (2022.01)
*G06F 9/54* (2006.01)
(Continued)

(52) U.S. Cl.
CPC .......... *H04L 63/0861* (2013.01); *G06F 9/543* (2013.01); *G10L 17/02* (2013.01);
(Continued)

(58) Field of Classification Search
CPC ... H04L 63/0861; H04L 63/083; H04L 63/08; G06F 9/543; G06F 2221/2137;
(Continued)

(56) References Cited

U.S. PATENT DOCUMENTS 9,749,332 B2 8/2017 Liu
10,489,568 B2 11/2019 Wang et al.
(Continued)

FOREIGN PATENT DOCUMENTS

CN 104994162 A 10/2015
CN 105678124 A 6/2016
(Continued)

*Primary Examiner* — Syed M Ahsan
(74) *Attorney, Agent, or Firm* — WOMBLE BOND DICKINSON (US) LLP

(57) ABSTRACT

This application provides an application running method and an electronic device. The method includes: displaying, by an electronic device, a first interface, where the first interface is an interface displayed after a target application APP is started; prompting, by the electronic device in a case that the electronic device determines that a running duration of the target APP is greater than or equal to a duration threshold, a user to enter a voice token, where the voice token is randomly generated by the target APP; and making the target APP exit, and displaying, by the electronic device, a second interface in response to determining, by the electronic device, according to the voice token entered by the user, that the user is a target user, where the second interface is an interface displayed by the electronic device after the target APP has exited.

19 Claims, 6 Drawing Sheets

(51) Int. Cl.

| | | |
|---|---|---|
| *G10L 17/02* | (2013.01) | |
| *G10L 17/06* | (2013.01) | |
| *G10L 17/24* | (2013.01) | |
| *G10L 17/26* | (2013.01) | |
| *H04L 9/40* | (2022.01) | |

(52) U.S. Cl.

CPC .............. *G10L 17/06* (2013.01); *G10L 17/24* (2013.01); *G10L 17/26* (2013.01); *H04L 63/083* (2013.01)

(58) Field of Classification Search

CPC ........ G06F 9/4401; G06F 9/451; G06F 21/30; G06F 21/32; G06F 21/629; G06F 21/46; G10L 17/02; G10L 17/06; G10L 17/24; G10L 17/26; A63F 13/424; A63F 13/79; A63F 13/75; A63F 13/54; A63F 2300/308

See application file for complete search history.

(56) References Cited

U.S. PATENT DOCUMENTS

| | | | | |
|---|---|---|---|---|
| 11,450,322 | B2 | 9/2022 | Zhou et al. | |
| 2013/0083003 | A1* | 4/2013 | Perez ................... | A63F 13/216 345/419 |
| 2018/0046818 | A1* | 2/2018 | Amacker ............ | G06F 21/6218 |
| 2021/0286863 | A1 | 9/2021 | Jung et al. | |
| 2022/0012547 | A1* | 1/2022 | Zhu ..................... | G06F 18/2411 |
| 2022/0124100 | A1* | 4/2022 | Yang ....................... | H04W 4/80 |
| 2022/0277752 | A1 | 9/2022 | Zhang et al. | |
| 2024/0082714 | A1* | 3/2024 | Osman ................ | G06F 21/6218 |

FOREIGN PATENT DOCUMENTS

| | | | | |
|---|---|---|---|---|
| CN | 105872688 | A | | 8/2016 |
| CN | 106161397 | A | | 11/2016 |
| CN | 107682745 | A | | 2/2018 |
| CN | 108537017 | A | | 9/2018 |
| CN | 109376678 | A | | 2/2019 |
| CN | 109522069 | A | | 3/2019 |
| CN | 109885999 | A | | 6/2019 |
| CN | 110321201 | A | | 10/2019 |
| CN | 110674478 | A | | 1/2020 |
| CN | 111773734 | A | | 10/2020 |
| CN | 112199128 | A | | 1/2021 |
| CN | 112434667 | A | * | 3/2021 |
| CN | 112451973 | A | | 3/2021 |
| CN | 112494950 | A | | 3/2021 |
| CN | 112507311 | A | * | 3/2021 |
| CN | 112863511 | A | | 5/2021 |
| CN | 113056901 | A | | 6/2021 |
| CN | 113470653 | A | | 10/2021 |
| CN | 113694537 | A | | 11/2021 |
| CN | 113742683 | A | | 12/2021 |
| CN | 113946810 | A | | 1/2022 |
| WO | 2017101266 | A1 | | 6/2017 |
| WO | 2018038536 | A1 | | 3/2018 |
| WO | 2021008538 | A1 | | 1/2021 |

* cited by examiner

APPLICATION RUNNING METHOD AND ELECTRONIC DEVICE

CROSS-REFERENCE TO RELATED APPLICATIONS

This application is a national stage of International Application No. PCT/CN2022/118130 filed on Sep. 9, 2022, which claims priority to Chinese Patent Application No. 202111485506.2 filed on Dec. 7, 2021. The disclosures of both of the aforementioned application are hereby incorporated by reference in their entireties.

TECHNICAL FIELD

Embodiments of this application relate to the field of terminal technologies, and in particular, to an application running method and an electronic device.

BACKGROUND

With the development of electronic devices, various applications (application, APP) keep emerging, for example, shopping APPs, education APPs, and game APPs, and an increasingly large population are addicted to APPs. For example, because minors lack sufficient self-control, as game APPs multiply, minors have no self-control with games and may keep playing games for several hours, causing a certain impact to the physical and mental health and academic performance of minors.

At present, it mainly relies on the self-control ability of minors and the supervision of parents to resolve the problem that minors are addicted to games. However, minors usually have low self-control, and it is hardly feasible for parents to supervise minors in real time. Therefore, for the problem that users are addicted to various APPs, no effective solution has been provided yet.

SUMMARY

Embodiments of this application provide an application running method and an electronic device. After determining that a running duration of a target APP is greater than or equal to a duration threshold, the electronic device performs voiceprint recognition on a current user, and makes the target APP exit after determining that the current user is a target user. Therefore, more efficient and intelligent supervision of users using APPs is implemented, and the problem that users are addicted to various APPs is solved.

To achieve the foregoing objective, the following technical solutions are used in this application:

According to a first aspect, an embodiment of this application provides an application running method, including: displaying, by an electronic device, a first interface, where the first interface is an interface displayed after a target application APP is started: prompting, by the electronic device in a case that the electronic device determines that a running duration of the target APP is greater than or equal to a duration threshold, a user to enter a voice token, where the voice token is randomly generated by the target APP: and making the target APP exit, and displaying, by the electronic device, a second interface in response to determining, by the electronic device, according to the voice token entered by the user, that the user is a target user, where the second interface is an interface displayed by the electronic device after the target APP has exited.

Therefore, after determining that a running duration of a target APP is greater than or equal to a duration threshold, the electronic device performs voiceprint recognition on a current user, and makes the target APP exit after determining that the current user is a target user, so that more efficient and intelligent supervision of users using APPs is implemented, and the problem that users are addicted to various APPs is solved. In addition, when the target user is a minor, the problem that minors are addicted to games is avoided.

In a possible implementation, the prompting, by the electronic device, a user to enter a voice token includes: periodically or randomly prompting, by the electronic device, the user to enter the voice token.

For example, after the electronic device determines that the running duration of the target APP is greater than or equal to the duration threshold, the electronic device may immediately prompt the user to enter the voice token, or the electronic device may prompt the user periodically (for example, at intervals of 5 minutes) to enter the voice token, or the electronic device may randomly prompt the user to enter the voice token. This is not limited herein. Therefore, an objective of real-time automatic supervision of users playing APPs is implemented.

In another possible implementation, the determining, by the electronic device, according to the voice token entered by the user, that the user is a target user includes:
performing, by the electronic device, voiceprint recognition on the voice token entered by the user, and determining, according to a voiceprint recognition result, that the user is the target user.

Therefore, the electronic device performs voiceprint recognition on the voice token entered by the user, and can accurately determine, according to the voiceprint recognition result, whether the user is the target user.

In another possible implementation, the performing, by the electronic device, voiceprint recognition on the voice token, and determining, according to a voiceprint recognition result, that the user is the target user includes:
inputting the voice token entered by the user into a trained voiceprint recognition model for voiceprint recognition, to obtain age information of the user, where the voiceprint recognition model has learned a mapping relationship between speech features of a speaker and corresponding age information: and determining, according to the age information of the user, that the user is the target user.

The voiceprint recognition model can accurately recognize age information corresponding to speech features of a speaker. Therefore, in this application, the voice token entered by the user is inputted into the voiceprint recognition model, and it may be determined, according to the age information outputted by the voiceprint recognition model, whether the user is the target user.

In another possible implementation, the prompting, by the electronic device, a user to enter a voice token includes:
displaying, by the electronic device, first prompt information on the first interface, where the first prompt information is used for prompting the user to enter the voice token by voice; or prompting, by the electronic device by voice, the user to enter the voice token.

Therefore, the electronic device may prompt, by displaying the prompt information or by voice, the user to enter the voice token, thereby achieving voiceprint recognition of the current user without interrupting the running of the target APP.

In another possible implementation, after the prompting, by the electronic device, a user to enter a voice token, the method further includes:

displaying, by the electronic device, a third interface in a case that the electronic device determines, according to the voice token entered by the user, that the user is a non-target user and the electronic device determines, according to the voice token entered by the user, that the user is a registered user of the target APP, where the third interface is an interface displayed when the target APP is running.

Therefore, the electronic device determines that the current user is a non-target user and a registered user of the target APP, and the target APP may continue to run.

In another possible implementation, after the determining, by the electronic device, according to the voice token entered by the user, that the user is a target user, the method includes:

displaying, by the electronic device, second prompt information, where the second prompt information is used for prompting the user that the running duration of the target APP has reached the duration threshold and the target APP is about to shut down.

Therefore, the electronic device determines that the current user is the target user and the running duration of the target APP has reached the threshold, and prompts the user that the target APP is about to exit, thereby achieving the objective of prompting the user.

In another possible implementation, the method further includes:

displaying, by the electronic device, a fourth interface in a process of starting the target APP, where the fourth interface includes that the target APP prompts the user to enter a token login password, where the token login password is preset token information: and displaying, by the electronic device, the first interface in a case that the electronic device determines, according to the token login password entered by the user, that the user is a target user and the electronic device determines that a moment at which the user enters the token login password is within a preset time period. The preset time is a time for limiting the target APP from running. Therefore, a login to the target APP can be implemented by using a token login password. The electronic device determines, when matching the token login password against pre-stored token information, whether the user entering the token login password is the target user.

In another possible implementation, after the displaying, by the electronic device, a fourth interface, the method further includes:

displaying, by the electronic device, a fifth interface in a case that the electronic device determines, according to the token login password entered by the user, that the user is a target user and the electronic device determines that the moment at which the user enters the token login password is outside the preset time period. The fifth interface is an interface displayed after the target APP is started.

Therefore, the electronic device determines that a moment at which the current user enters the token login password by voice is outside the time period for restricting the running of the target APP, and the target APP is normally started.

In another possible implementation, after the displaying, by the electronic device, a fourth interface, the method further includes:

displaying, by the electronic device, a fifth interface in a case that the electronic device determines, according to the token login password entered by the user, that the user is a non-target user.

Therefore, the electronic device determines that the current user is a non-target user, and the target APP is normally started. For example, if the target user is a minor, the target APP is a game APP, and the electronic device determines that the current user is an adult, the game APP can be normally started.

In another possible implementation, the target APP includes a game APP, a shopping APP or a short video APP.

According to a second aspect, this application provides an electronic device. The electronic device has a function of implementing the method in the foregoing first aspect. The function may be implemented by using hardware, or may be implemented by hardware executing corresponding software. The hardware or software includes one or more modules corresponding to the above function. For example, the electronic device includes an intelligent recognition module, and the intelligent recognition module is configured to: display, by the electronic device, a first interface, where the first interface is an interface displayed after a target application APP is started: prompt, by the electronic device in a case that the electronic device determines that a running duration of the target APP is greater than or equal to a duration threshold, a user to enter a voice token, where the voice token is randomly generated by the target APP: and make the target APP exit, and display, by the electronic device, a second interface in response to determining, by the electronic device, according to the voice token entered by the user, that the user is a target user, where the second interface is an interface displayed by the electronic device after the target APP has exited.

According to a third aspect, this application provides an electronic device, including: one or more processors: and a memory, where the memory stores one or more computer programs, the one or more computer programs including instructions, and the instructions, when executed by the electronic device, cause the electronic device to perform the application running method according to any one of the first aspect.

According to a fourth aspect, this application provides a computer-readable storage medium, storing computer instructions, where the computer instructions, when run on an electronic device, cause the electronic device to perform the application running method according to any one of the first aspect.

According to a fifth aspect, this application provides a computer program product, including computer instructions, where the computer instructions, when run on an electronic device, cause the electronic device to perform the application running method according to any one of the first aspect.

It may be understood that, the electronic device according to the second aspect and the third aspect, the computer storage medium according to the fourth aspect, and the computer program product according to the fifth aspect that are provided above are all configured to perform the corresponding method provided above. Therefore, for beneficial effects that can be achieved therein, reference may be made to beneficial effects in the corresponding method provided above, and details are not described herein again.

DESCRIPTION OF EMBODIMENTS

Figure 1:
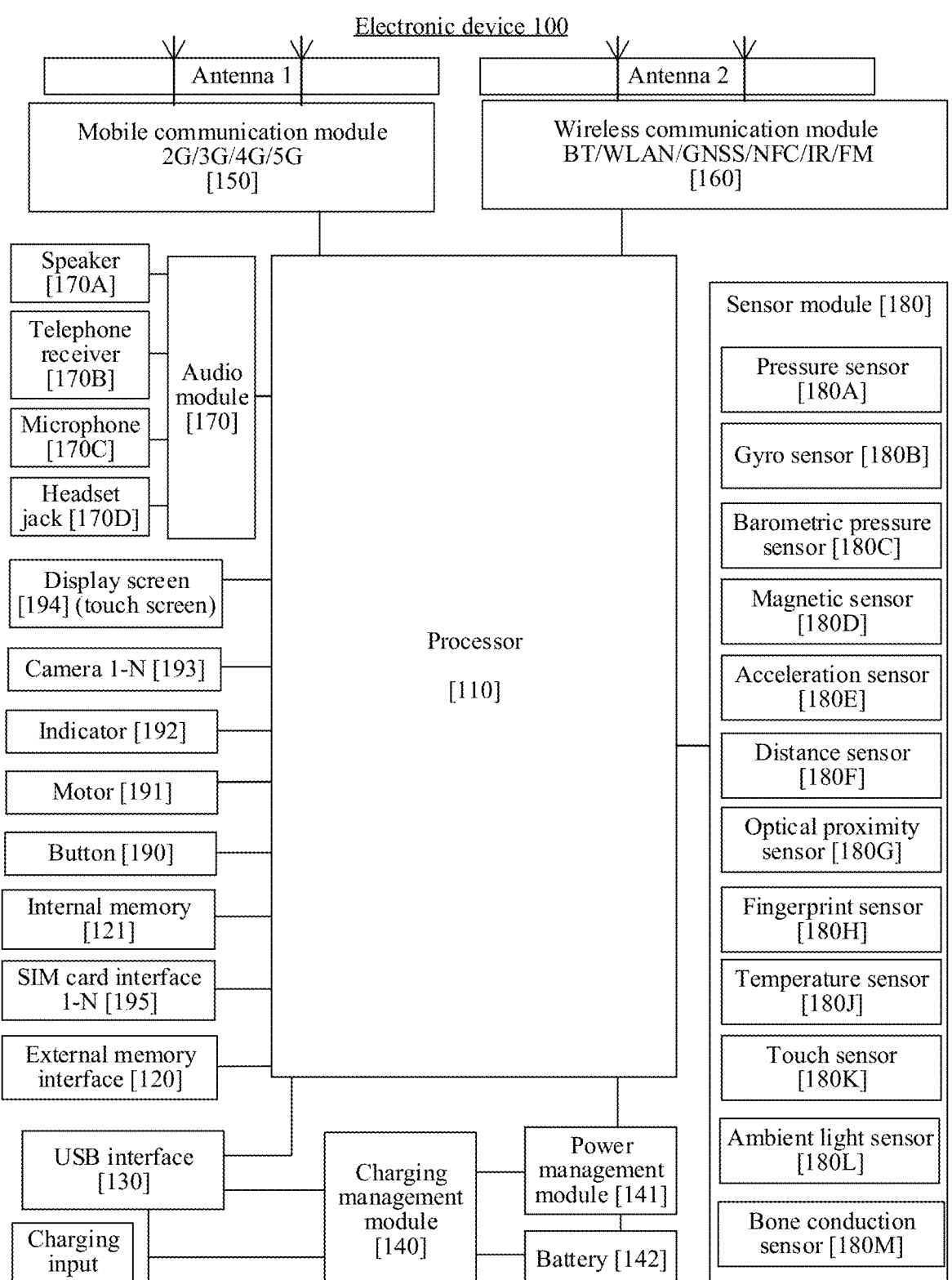
FIG. 1 is a schematic structural diagram 1 of an electronic device according to an embodiment of this application.

Technical solutions in embodiments of this application are described below with reference to the accompanying drawings in the embodiments of this application. In the descriptions of the embodiments of this application, "/" means "or" unless otherwise specified. For example, A/B may represent A or B. In this specification, "and/or" describes only an association relationship for describing associated objects and indicates that three relationships may exist. For example, A and/or B may represent the following three cases: only A exists, both A and B exist, and only B exists.

The terms "first" and "second" mentioned below are merely intended for an objective of description, and shall not be understood as an indication or implication of relative importance or implicit indication of the quantity of indicated technical features. Therefore, a feature defined by "first" or "second" can explicitly or implicitly includes one or more features. In the description of the embodiments of this application, unless otherwise stated, "a plurality of" means two or more.

In the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "for example" or the like is intended to present a related concept in a specific manner.

At present, to prevent minors from being addicted to games, anti-addiction restrictions are usually only imposed on players registered as minors. However, when an adult registers an account, it is impossible to determine whether a person currently playing a game using the account of the adult is a minor, and a minor may register an account using the information of a parent to play a game for a long time. Therefore, current game anti-addiction methods cannot effectively solve the problem that minors are addicted to games.

Therefore, the embodiments of this application provide an application running method. In the method, an electronic device may manage the use of a target APP (for example, a game APP, a short video APP or a shopping APP) by a target group (for example, minors or the elderly) according to a dynamic voice token. For example, after the electronic device determines, according to a voice token password entered by a user to log in to a game APP, that user who has logged in is a minor, and further after the electronic device determines that a moment at which the minor logs in to the game APP is within a preset time period and a game play duration of the minor reaches a duration threshold, the game APP prompts the user to enter a randomly generated voice token by voice. If the electronic device determines that the user entering the voice token is a minor, the game APP exits the game. If the electronic device determines that the user entering the voice token is an adult and determines that the adult is the same person who has registered for the game APP, the game APP continues to run. Therefore, an objective of automatic supervision of game playing of minors is achieved, and the supervision of game playing of minors is more efficient and intelligent, thereby avoiding the problem that minors are addicted to games.

For example, the application running method provided in the embodiments of this application may be applicable to electronic devices with a display screen, such as a mobile phone, a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, an in-vehicle device, a smart car, a smart speaker, or the like. This is not limited in the embodiments of this application.

FIG. 1 is a schematic structural diagram of an electronic device according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in the embodiments of this application constitutes no specific limitation on the electronic device 100. In some other embodiments of this application, the electronic device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a timing signal, and read an instruction and control execution of the instruction.

A memory may be further configured in the processor 110, to store an instruction and data. In some embodiments, the memory in the processor 110 is a cache memory. The memory may store an instruction or data that is recently used or cyclically used by the processor 110. If the processor 110 needs to use the instruction or the data again, the processor may directly invoke the instruction or the data from the memory, which avoids repeated access, and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may further be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device 100. The processor 110 communicates with the display screen 194 by using a DSI interface, to implement a display function of the electronic device 100.

The GPIO interface may be configured by using software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, and the like. The GPIO interface may alternatively be configured as an I2C interface, an I2S interface, a UART interface, a MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

It may be understood that a schematic interface connection relationship between the modules in the embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some functional modules of the mobile communication module 150 may be configured in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal by using an audio device (not limited to the speaker 170A, the phone receiver 170B, or the like), or displays an image or a video by using the display screen 194. In some embodiments, the modem processor may be an independent device. In some other embodiments, the modem processor may be independent of the processor 110, and the modem processor and the mobile communication module 150 or another function module may be disposed in a same component.

The wireless communication module 160 may provide a solution for wireless communication solution including a wireless local area network (wireless local area network, WLAN) (for example, a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 100. The wireless communication module 160 may be one or more components into which at least one communication processing module is integrated. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculations and to render graphics. The processor 110 may include one or more GPUs and execute program instructions to generate or change display information.

The display screen 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a MicrooLed, quantum dot light emitting diodes (quantum dot light emitting diodes, QLED), and the like. In some embodiments, the electronic device 100 may include 1 or N display screens 194. N is a positive integer greater than 1.

The electronic device 100 can implement a photographing function by using the ISP, the camera 193, the video codec, the GPU, the display screen 194, the application processor, and the like.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 100, for example, image recognition, facial recognition, voice recognition, and text understanding.

The external memory interface 120 may be configured to connect to an external storage card such as a micro SD card, to expand a storage capability of the electronic device 100. The external storage card communicates with the processor 110 by using the external memory interface 120, so as to implement a data storage function, such as storing a file such as music or a video in the external storage card.

The internal memory 121 may be configured to store computer executable program code, where the executable program code includes an instruction. The processor 110 runs the instruction stored in the internal memory 121, to perform various function applications and data processing of the electronic device 100. The internal memory 121 may include a program storage region and a data storage region. The program storage area may store an operating system, an application program required by at least one function (for example, a sound playback function and an image display function), and the like. The data storage region may store data (for example, audio data and an address book) and the like created when the electronic device 100 is used. In addition, the internal memory 121 may include a high-speed random access memory, and may further include a non-volatile memory, for example, at least one disk storage device, a flash memory device, or a universal flash storage (universal flash storage, UFS).

The electronic device 100 may implement an audio function such as music playing or recording by using the audio module 170, the speaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110. In the embodiments of this application, the audio module 170 is configured to convert a login password or a voice token entered by a user into a digital audio signal.

The speaker 170A, also referred to as a "loudspeaker", is configured to convert an audio electrical signal into a sound signal. Music can be listened to or a hands-free call can be answered by using the speaker 170A in the electronic device 100.

The telephone receiver 170B, also referred to as a "receiver", is configured to convert an audio electrical signal into a sound signal. When the electronic device 100 is used to answer a call or receive voice information, the telephone receiver 170B may be put close to a human ear, to receive the voice information.

The microphone 170C, also referred to as a "microphone" or a "microphone", is configured to convert a sound signal into an electrical signal. When making a call or sending voice information, a user may speak with the mouth approaching the microphone 170C, to enter a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The key 190 includes a power key, a volume key, and the like. The key 190 may be a mechanical key, or a touch-type key. The electronic device 100 may receive a key input, and generate a key signal input related to user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. The motor 191 may further correspond to different vibration feedback effects for touch operations applied to different areas of the display screen 194. Different application scenarios (for example, a time reminder, information receiving, an alarm clock, and a game) may further correspond to different vibration feedback effects. A touch vibration feedback effect may be further customized.

The indicator 192 may be an indicator light, may be configured to indicate a charging state and a battery change, and may be further configured to indicate a message, a missed call, a notification, and the like.

A software system of the electronic device may use a layered architecture, an event-driven architecture, a micro-kernel architecture, a micro service architecture, or a cloud architecture. In the embodiments of the present invention, an Android system with a layered architecture is used as an example to illustrate a software structure of the electronic device.

Figure 2:
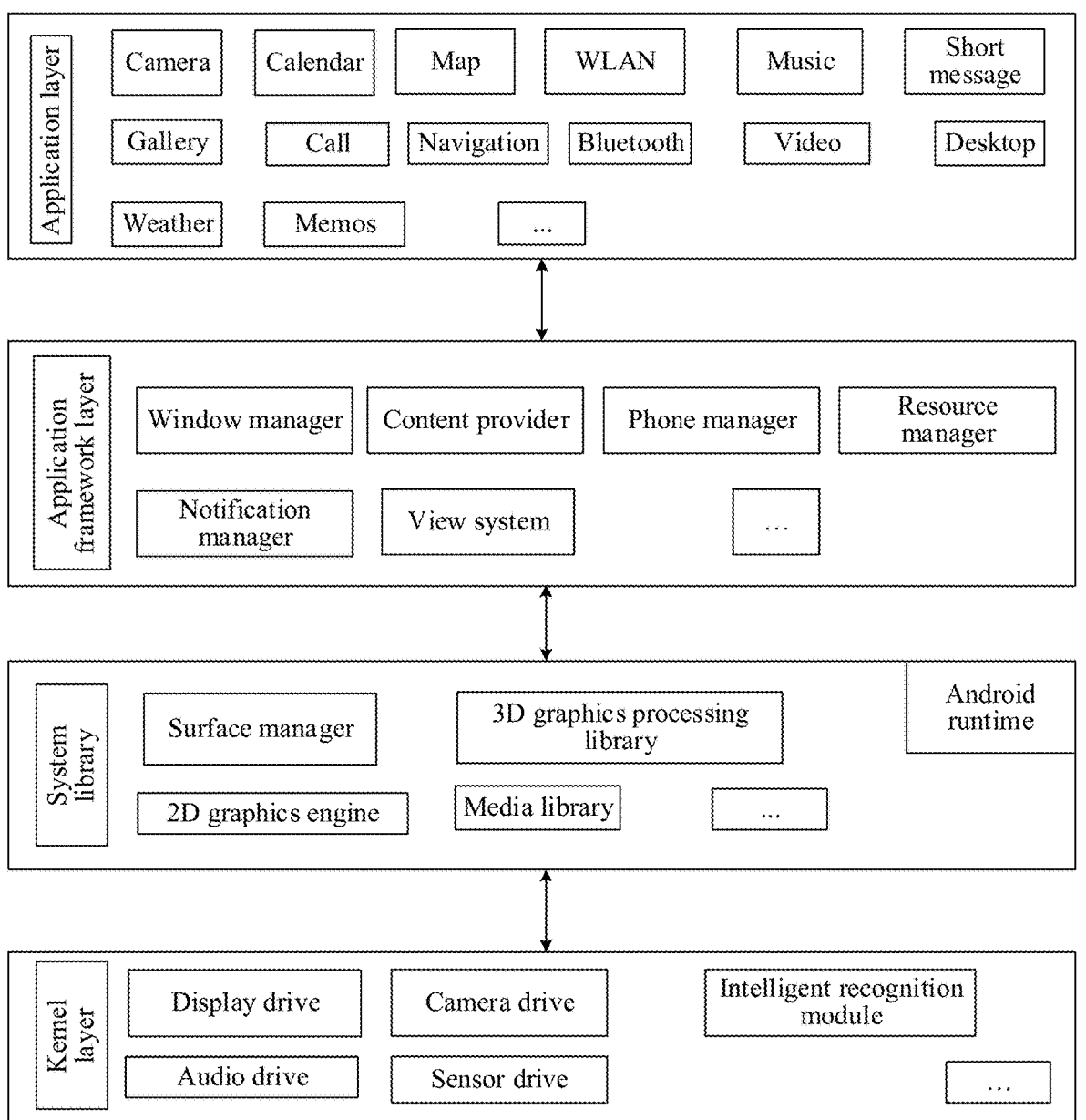
FIG. 2 is a schematic structural diagram 2 of an electronic device according to an embodiment of this application.

FIG. 2 is a diagram of a software structure of an electronic device according to an embodiment of this application.

In a layered architecture, software is divided into several layers, and each layer has a clear role and task. The layers communicate with each other through a software interface. In some embodiments, the Android system may include an application program layer (application layer for short) and an application framework layer (framework layer for short).

The foregoing application layer may include a series of application packages.

As shown in FIG. 2, the application packages include system applications. The system applications refer to applications that are set in the electronic device before the electronic device is delivered from the factory. For example, the system applications may include programs such as setting, electronic device manager, camera, gallery, calendar, music, short message, and call.

The application packages may further include third-party applications, and the third-party applications refer to applications installed by the user after downloading installation packages from an application store (or an application market). For example, game applications (for example, Honor of Kings® and Peacekeeper Elite®), map applications (for example, Baidu Map® and AutoNavi Map®), takeaway applications (for example, Meituan® and Ele.me®), reading applications (for example, E-books®), social applications (for example, WeChat®), and travel applications (for example, Didi Taxi®), or the like.

The foregoing application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window application. The window manager may obtain a size of a display screen, determine whether there is a status bar, lock a screen, capture a screen, and the like.

The content provider is configured to store and obtain data, so that the data can be accessed by an application. The data may include a video, an image, audio, calls made and answered, a browsing history and bookmarks, an address book, and like.

The view system includes a visual control such as a control for text display or a control for picture display. The view system may be configured to construct an application. A display interface may be formed by one or more views. For example, a display interface including an SMS notification icon may include a view for displaying text and a view for displaying a picture.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted for in the status bar, an announcement is produced, the mobile phone vibrates, or the indicator light blinks.

The Android Runtime includes a kernel library and a virtual machine. The Android runtime is responsible for scheduling and managing the Android system.

The core library includes two parts: one part is a performance function that the Java language needs to invoke, and the other part is a core library of Android.

The application layer and the application framework layer run on the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules, For example, such as a surface manager (surface manager), a media library (Media Libraries), a 3D graphics processing library (for example, OpenGL ES), and a 2D graphics engine (for example, SGL).

The surface manager is configured to manage a display subsystem, and provide fusion of 2D and 3D layers to a plurality of applications.

The media library supports playback and recording of a plurality of common audio and video formats, a static image file, and the like. The media library may support a plurality of audio and video encoding formats, for example, MPEG4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawings.

The kernel layer is a layer between hardware and software. The kernel layer includes at least an intelligent recognition module, a display drive, a camera drive, an audio drive, and a sensor drive.

The intelligent recognition module is configured to determine, according to a login password entered by the user by voice, whether the user who has logged in to the game APP is a minor; and is further configured to measure a game play duration of the user, and determine whether the game play duration of the user is greater than or equal to a duration threshold in a game play process of the user. The intelligent recognition module is further configured to determine whether the user currently playing the game is a minor in the game play process of the user. If determining that the user currently playing the game is an adult, the intelligent recognition module continues to determine whether the adult is a registered user.

All technical solutions included in the following embodiments can be implemented in the electronic device 100 having the foregoing hardware structure and software architecture. An exemplary description of the solution is made below by still using an example in which the electronic device 100 is a mobile phone.

In some embodiments, the mobile phone may control, according to the voice token entered by the user of the target APP by voice, a use duration and/or a use time of using a target APP (for example, a game APP, a short video APP or a shopping APP) by a target group (for example, minors or the elderly).

Figure 3:
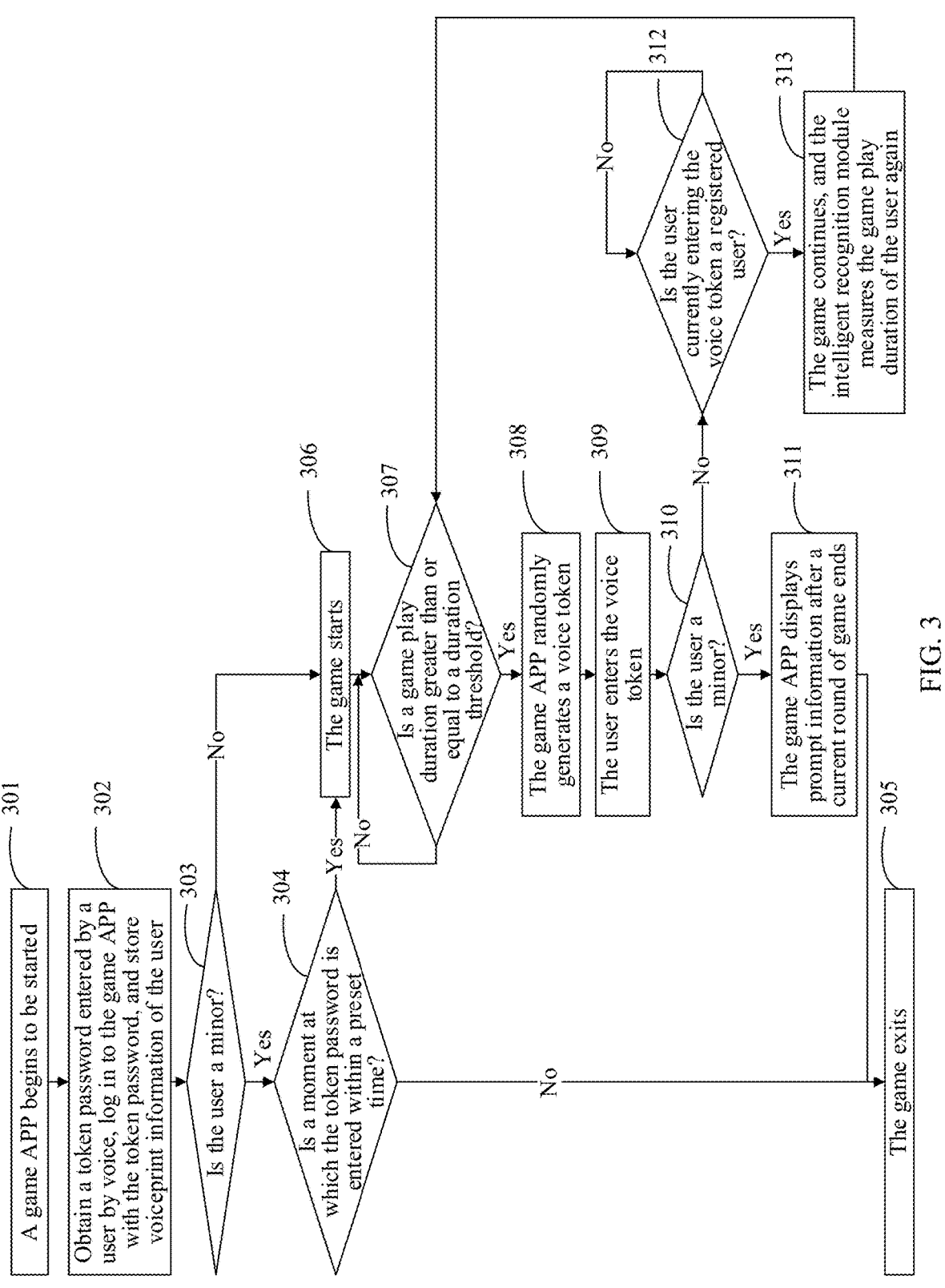
FIG. 3 is a schematic flowchart of an application running method according to an embodiment of this application.

For example, the target group is minors, and the target APP is a game APP. In the process of starting the game APP, after the intelligent recognition module determines, according to a voice token password entered by the user by voice when the user logs in to the game APP, that the current user who has logged in is a minor, the intelligent recognition module determines that the moment at which the minor logs in to the game APP is within the preset time period, and the intelligent recognition module determines that the game play duration of the minor reaches the duration threshold, the game APP prompts the user to enter a randomly generated voice token by voice. The game APP exits the game after the intelligent recognition module determines that the user entering the voice token is a minor. When the intelligent recognition module determines that the user entering the voice token is an adult and determines that the adult is the same person who has registered for the game APP, the game APP continues to run. The solution is described below in detail with reference to FIG. 3. As shown in FIG. 3, the method may include the following steps.

Step 301: A game APP on a mobile phone begins to be started.

Step 302: The mobile phone obtains a token password entered by a user by voice, logs in to the game APP with the token password, and stores voiceprint information of the user.

Figure 4:
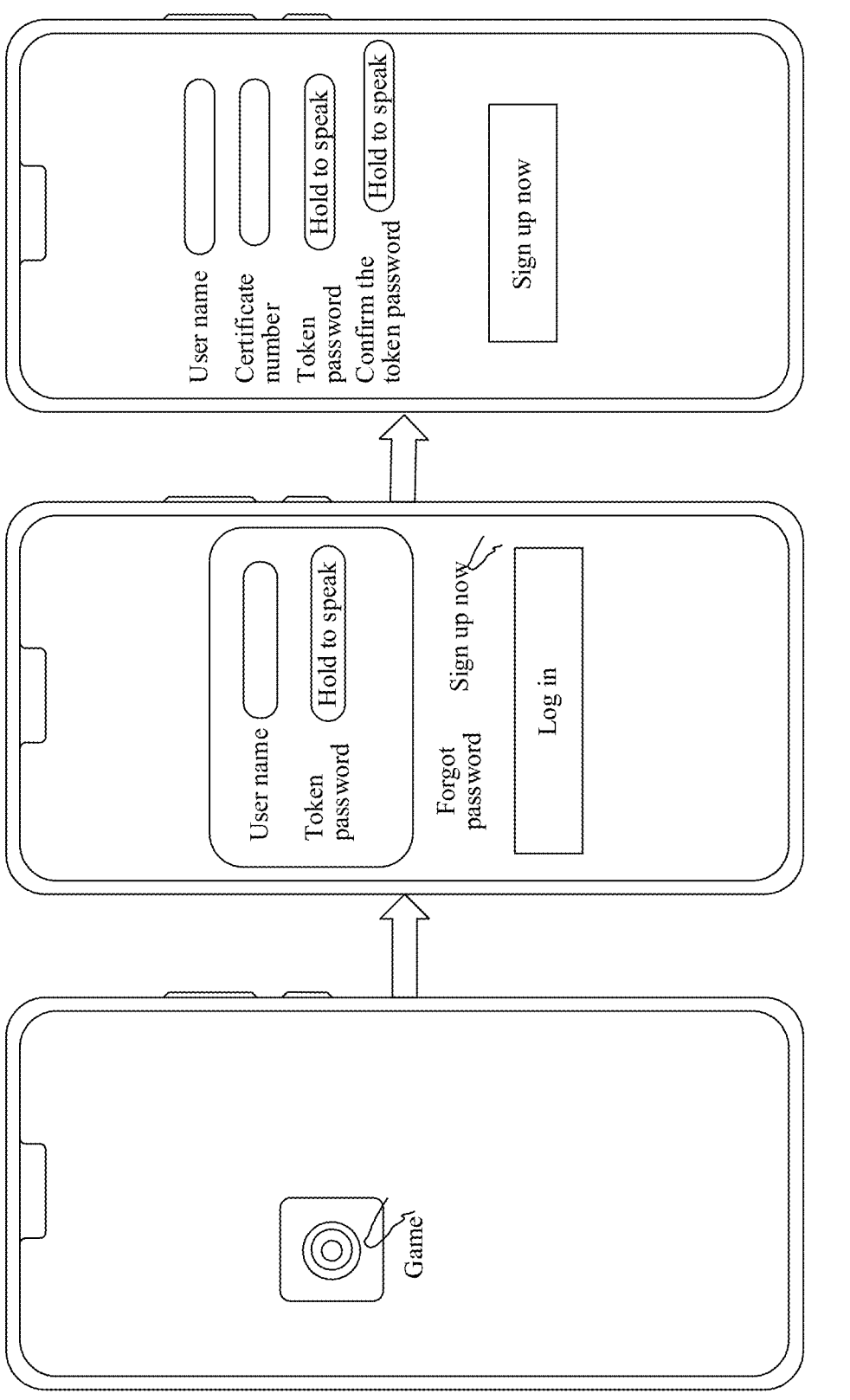
FIG. 4 is a diagram 1 of an application running scenario according to an embodiment of this application.

In some embodiments, as shown in FIG. 4, when the mobile phone starts a game APP (for example, Honor of Kings® and Peacekeeper Elite®) in response to an operation by the user, a display interface of the game APP displays prompt information to prompt the user to perform account registration or account login.

It should be noted that the operation by starting the game APP by the user may be a touch operation by the user on an application icon of the game APP displayed on the display screen of the mobile phone, a single-/double-click operation by the user on an application icon of the game APP displayed on the display screen of the mobile phone, a voice control operation by the user on the game APP, or the like. This is not limited herein.

In a possible case, if the user does not have a login account of the game APP, the display screen of the mobile phone displays a registration interface of the game in response to the operation by the user. The user may enter a user name, a certificate number, a token password, and other information on the registration interface of the game. The token password can be any token set by the user, which is not limited herein. For example, the token password may be set to "I want to play games today", "Have fun playing games", and the like.

In another possible case, if the user has registered a login account of the game APP, when the user starts the game APP, the game APP enters a login interface in response to an operation by the user. After the user enters the token password by voice and the mobile phone obtains the token password entered by the user by voice, the intelligent recognition module compares the token password entered by the user by voice with a preset token password. If the intelligent recognition module determines that the token password entered by the user by voice matches the preset token password, the intelligent recognition module determines, according to the token password entered by the user by voice, whether the user is a minor, to determine whether to start the game APP.

In a possible case of the embodiments of this application, the game APP may preset a login verification mode of the game APP in response to an operation by the user. For example, when the mobile phone starts a game APP in response to an operation by the user, a startup interface of the game APP may display prompt information to prompt the user to select a login verification mode. The login verification may include one or a combination of multiple of token login verification, face image login verification, fingerprint login verification or password login verification. For example, the user may log in to the game APP by entering a voice token password and a fingerprint.

Step 303: The intelligent recognition module determines, according to the token password entered by the user by voice, whether the user is a minor.

In the embodiments of this application, if the intelligent recognition module determines that the token password entered by the user by voice matches the preset token password, the intelligent recognition module determines, according to the token password entered by the user by voice, whether the user is a minor.

In some embodiments, the intelligent recognition module can perform voiceprint recognition on the voice token entered by the user by voice, to determine whether the user is a minor.

The voiceprint recognition is also known as speaker recognition, including two types, that is, speaker recognition and speaker confirmation. The former is used for determining which one of several people has said a piece of speech, which is a problem of "selecting one from multiple". The latter is used for confirming whether a piece of speech is spoken by a designated person, which is a problem of "one-to-one discrimination".

In some embodiments, the intelligent recognition module may input the token password entered by the user by voice into a trained voiceprint recognition model, and the voiceprint recognition model outputs an age of the user, that is, a voiceprint recognition model determines whether the user is a minor. The voiceprint recognition model is trained by using speech samples of people from different age groups and has learned a mapping relationship between speech features and a corresponding age. Therefore, after the intelligent recognition model inputs the token password entered by the user by voice into the voiceprint recognition model, the voiceprint recognition model can accurately identify the age of the user.

It should be noted that the method in which the intelligent recognition module inputs the token password entered by the user by voice into the voiceprint recognition model to determine whether the user is a minor is only used for exemplary description. Any method that can determine, according to the token password entered by the user by voice, whether the user is a minor is applicable to this application, which is not limited herein.

In a possible case, the intelligent recognition module performs voiceprint recognition on the token password entered by the user by voice. If determining that the user entering the token password by voice is a minor, the intelligent recognition module continues to determine whether a moment at which the minor enters the token password is within a game time limit. That is, step 304 is performed next.

In another possible case, the intelligent recognition module performs voiceprint recognition on the token password entered by the user by voice. If determining that the user entering the token password by voice is not a minor, the intelligent recognition module sends the case that the user is not a minor to the game APP, and the game APP is normally started. That is, step 306 is performed next.

Step 304: The intelligent recognition module determines whether a moment at which the user enters the token password by voice is within a preset time.

The preset time is a time limit for minors to play games. For example, according to the latest national regulations, all online game companies can only provide services to minors for 1 hour from 20:00 to 21:00 every day on Fridays, Saturday, Sunday, and statutory holidays, and shall not provide online game services to minors in any form within other periods of time. That is, the preset time may be any time within 20:00 to 21:00 every day on Fridays, Saturday, Sunday, and statutory holidays.

In the embodiments of this application, the intelligent recognition module performs voiceprint recognition on the token password entered by the user by voice. After determining that the user entering the token password by voice is a minor, the intelligent recognition module continues to determine whether a moment at which the minor enters the token password by voice is within the preset time, to determine whether to start the game APP.

In a possible case, the intelligent recognition module determines that the moment at which the user enters the token password by voice is not within the preset time, and step 305 is performed, that is, makes the game exit. For example, if the preset time is from 20:00 to 21:00 every day on Friday, Saturday, Sunday, and statutory holidays, the intelligent recognition module determines that the moment at which the user enters the token password by voice is 22:10 on Thursday, and the intelligent recognition module may determine that the moment at which the user enters the token password by voice is not within the preset time. In this case, to prevent minors from playing games outside the game playing time regulated by the nation, the game APP exits the login process.

In another possible case, the intelligent recognition module determines that the moment at which the user enters the token password by voice is within the preset time, and step 306 is performed, that is, the game is started. For example, if the preset time is from 20:00 to 21:00 every day on Friday, Saturday, Sunday, and statutory holidays, the intelligent recognition module determines that the moment at which the user enters the token password by voice is 20:10 on Saturday, and the intelligent recognition module may determine that the moment at which the user enters the token password by voice is within the preset time. In this case, if the intelligent recognition module determines that the moment at which the minor logs in to the game APP is within the game playing time regulated by the nation, the game APP is started.

Step 305: Make the game exit.

Step 306: Make the game start.

Step 307: The intelligent recognition module determines whether a game play duration of the user is greater than or equal to a duration threshold.

In some embodiments of this application, after the intelligent recognition module determines that the user is an adult, or after determining that the user starts the game APP within the preset time, the intelligent recognition module may measure the game play duration of the user in real time, to further determine whether the game play duration of the user is greater than or equal to the duration threshold.

In a possible scenario, the intelligent recognition module determines in the foregoing step 303 that the user who has currently logged in to the game APP is not a minor, that is, the intelligent recognition module determines that the user who has currently logged in to the game APP is an adult, and the game APP is started. The intelligent recognition module measures a game play duration of the adult in real time, and determines whether the game play duration of the adult is greater than or equal to the duration threshold.

In another possible scenario, the intelligent recognition module determines in the foregoing step 303 that the user who has currently logged in to the game APP is a minor, and the intelligent recognition module determines that the moment at which the minor logs in to the game APP is within the preset time. The intelligent recognition module measures a game play duration of the minor in real time, and determines whether the play duration of the minor is greater than or equal to the duration threshold.

In a possible case, the intelligent recognition module measures the game play duration of the user in real time. If determining that the game play duration of the user is less than the duration threshold, the intelligent recognition module continues to measure the game play duration of the user. For example, if the duration threshold is 1 hour and the intelligent recognition module has measured that the game play duration of the current user is 30 minutes, the intelligent recognition module continues to measure the game play duration of the user, and compares the updated duration with the duration threshold.

In another possible case, the intelligent recognition module measures the game play duration of the user in real time. If determining that the game play duration of the user is greater than or equal to the duration threshold, the intelligent recognition module continues to determine whether the user currently playing the game is a minor, that is, step 308 is performed next. For example, if the duration threshold is 1 hour, and the intelligent recognition module has measured that the game play duration of the current user is 1 hour and 10 minutes, the intelligent recognition module continues to determine that the game play duration of the current user is greater than the duration threshold, and the intelligent recognition module continues to determine whether the user currently playing the game is a minor.

Step 308: The game APP randomly generates a voice token.

Step 309: The user enters the voice token.

Step 310: The intelligent recognition module continues to determine whether the user is a minor.

In the embodiments of this application, the intelligent recognition module measures the game play duration of the user in real time, and determines that the game play duration of the user is greater than or equal to the duration threshold, and the mobile phone randomly generates the voice token. After the user enters by voice the voice token randomly generated by the mobile phone, the intelligent recognition module continues to determine, according to the voice token entered by the user by voice, whether the user currently playing the game is a minor. The voice token may be randomly generated by the mobile phone. For example, a game APP in the mobile phone randomly generates a voice token. Therefore, it is ensured that the intelligent recognition module determines, according to the voice token entered by the user by voice, whether the user is a minor without interrupting game playing of the user, thereby keeping the game experience of the user from being affected.

Figure 5:
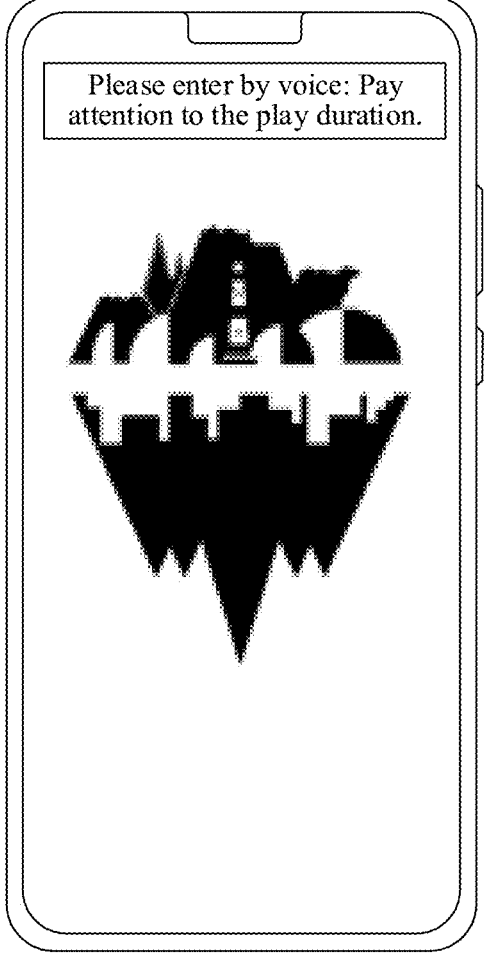
FIG. 5 is a diagram 2 of an application running scenario according to an embodiment of this application.

In some embodiments, in the game play process of the user, after the intelligent recognition module determines that the game play duration of the user is greater than or equal to the duration threshold and the game APP may randomly generate a voice token, first prompt information may be displayed on the display interface of the game APP to prompt the user to enter the voice token by voice. For example, as shown in FIG. 5, it is assumed that the display interface of the game APP displays the first prompt information "Please enter by voice: Pay attention to the play duration." through a pop-up window. Alternatively, after the intelligent recognition module determines that the game play duration of the user is greater than or equal to the duration threshold and the game APP may randomly generate a voice token, the target APP may prompt the user through a voice playback to enter the voice token by voice. For example, the game APP can prompt the user by voice "Please enter by voice: Pay attention to the play duration." through a pop-up window. The manner of prompting the user to enter a voice token by voice is not limited in the embodiments of this application.

It should be noted that the prompt information shown in FIG. 5 is only used for an exemplary description, and the prompt information may be displayed at any position on the display interface of the game APP, which is not limited herein. For example, the prompt information is displayed in any area such as an upper side, a lower side, a left side or a right side of the display interface of the game APP.

It may be understood that, in the game play process of the user, the game APP randomly generates a voice token at any time, which prevents the problem that a minor records or videotapes a voice token entered by an adult and pretend to be an adult to play games.

In some embodiments, the game APP may randomly generate a voice token after each round of game ends, or the game APP may randomly generate a voice token periodically (for example, at intervals of 10 minutes and 15 minutes), or the game APP may randomly generate a voice token at any time. This is not limited herein.

In the embodiments of this application, for the process in which the intelligent recognition module determines, according to the voice token entered by the user, whether the user is a minor, reference may be made to the recognition process in the foregoing step 303, and details are not described herein again.

In a possible case, the intelligent recognition module performs voiceprint recognition on the voice token entered by the user and determines that the user is a minor, and step 311 is sequentially performed. For example, in a game play process of a minor, after the intelligent recognition module determines that the game play duration of the minor is greater than the duration threshold and the game APP randomly generates a voice token, the minor enters the voice token by voice. The intelligent recognition module determines that the user entering the voice token is a minor, and the play duration of the minor has reached the duration threshold. After a current round of game ends, the game APP prompts the minor that the play duration has ended and the game is about to exit. Therefore, in the game play process of a minor, the intelligent recognition module determines that the minor has played games overtime, prompts the user in time, and makes the game APP exit the game, thereby implementing the objective of real-time supervision of game playing of minors, and avoiding the problem that minors are addicted to games.

In some embodiments, voiceprint recognition is performed on the voice token entered by the user, and it is determined that the user is a minor and the game play duration of the minor is greater than or equal to the duration threshold. In this case, if a parent rewards the minor with an extra duration, the minor may be allowed to continue to play the game for a period of time outside the preset time. For example, if the duration threshold is 30 minutes, a minor has played a game from 20:00 to 20:34 on Friday, and a parent decides that the minor has performed well in a current week, the parent may set the game APP to allow the minor to continue to play the game for 20 minutes.

In another possible case, the intelligent recognition module performs voiceprint recognition on the voice token entered by the user and determines that the user is an adult, and step 312 is performed. For example, in a game play process of an adult, if the intelligent recognition module determines that a game play duration of the adult is greater than the duration threshold and the game APP randomly generates a voice token, the adult enters the voice token by voice. The intelligent recognition module determines that the user entering the voice token is a n adult, and the play duration of the adult has reached the duration threshold. The intelligent recognition module continues to determine whether the adult is a registered user.

Step 311: The game APP displays prompt information after a current round of game ends.

In some embodiments of this application, if the intelligent recognition module determines that the game play duration is greater than or equal to the duration threshold and determines that the user is a minor, the game APP displays second prompt information after the current round of game ends, to prompt the user that the play duration has reached the duration threshold and the game is about to exit. Next, the game APP logs out, and the current user cannot continue to play the game. Therefore, the problem that minors are addicted to games for a long time is avoided without affecting the game experience of the user.

Figure 6:
FIG. 6 is a diagram 3 of an application running scenario according to an embodiment of this application.

In an example, as shown in FIG. 6, the game APP displays second prompt information "The play duration has ended. The game exits." after a current round of game ends. If a moment at which the game APP displays the second prompt information is within a preset time period, the game directly exits after the game APP displays the prompt information. If a moment at which the game APP displays the second prompt information is outside the preset time period, when the game APP displays the second prompt information, the game APP may determine, in response to a selection operation by the user, whether to exit the game. As shown in FIG. 6, if the parent permits the minor to continue to play for 10 minutes, the game APP may continue with the game in response to an operation by the parent on the "No" control.

It should be noted that after the current round of game ends, the game APP may prompt the user by voice that the play duration has reached a duration threshold and the game is about to exit. Alternatively, the game APP may prompt the user through a prompt sound, a flashing screen, or the like, which is not limited herein.

In some other embodiments of this application, after the intelligent recognition module determines that the user is an adult or determines that the user has started the game APP within a preset time, the intelligent recognition module may measure the game play duration of the user after each round of game ends in the game play process of the user. If the intelligent recognition module determines that the game play duration of the user is greater than the duration threshold after a current round of game ends, the game APP randomly generates a voice token and prompts the user to enter the voice token by voice. If the intelligent recognition module determines that the user entering the voice token by voice is a minor, the game APP exits the game. Therefore, the intelligent recognition module randomly generates a voice token for user detection after determining that the game play duration of the user is greater than the duration threshold when each round of game ends, thereby avoiding the problem that game playing experience of the user is affected when the user is prompted to enter a voice token in the game play process, so that the game playing experience of the user can be improved and the user can be prevented from being addicted to games.

Step 312: The intelligent recognition module determines whether the user currently entering the voice token is a registered user.

In the embodiments of this application, the intelligent recognition module determines that a game play duration of the user is greater than or equal to the duration threshold and determines that the user is an adult, and the intelligent recognition module continues to determine whether the user entering the voice token is a registered user.

It may be understood that the intelligent recognition module determines, according to the voice token randomly entered by the user during the game, that the user currently entering the voice token is an adult, and the intelligent recognition module determines whether the adult is a registered user. Therefore, the problem that another adult enters the voice token in place of a guardian in the game play process of a minor is avoided, thereby avoiding the problem that minors are addicted to games.

In a possible case, after the intelligent recognition module determines that the user currently entering the voice token is an adult and the intelligent recognition module determines, according to the voice token entered by the current user by voice, that the user currently entering the voice token is a registered user, the game continues, that is, step 313 is performed.

In another possible case, after the intelligent recognition module determines that the user currently entering the voice token is an adult and the intelligent recognition module determines, according to the voice token entered by the current user by voice, that the user currently entering the voice token is a non-registered user, the intelligent recognition module continues to perform identification recognition on the user currently entering the voice token to determine whether the user is a registered user.

Step 313: The game continues, and the intelligent recognition module measures the game play duration of the user again.

In the embodiments of this application, if the intelligent recognition module determines, according to the voice token entered by the current user by voice, that the user currently entering the voice token is a registered user, the game continues, and the intelligent recognition module measures the game play duration of the user again.

In summary, in the embodiments of this application, after the intelligent recognition module determines, according to a voice token password entered by a user by voice when the user logs in to a game APP, that the user who has logged in is a minor, the intelligent recognition module determines that a moment at which the minor logs in to the game APP is within a preset time period, and the intelligent recognition module determines that a game play duration of the minor reaches a duration threshold, the game APP prompts the user to enter a randomly generated voice token by voice, and the game APP exits a game after the intelligent recognition module determines that the game play duration of the user has ended. Therefore, an objective of automatic supervision of game playing of minors is achieved, and the supervision of game playing of minors is more efficient and intelligent, thereby avoiding the problem that minors are addicted to games.

Compared with supervision of game playing of minors relying on guardian supervision or self-control of minors in the related art, in this application, it is recognized in real time by using voiceprint recognition whether a user playing a game is a minor, and a game play duration of the minor is measured, so that the efficiency of supervising game playing of minors is improved and the problem that minors are addicted to games is avoided.

In the related art, in a face recognition-based method used to prevent minors from being addicted to games, a third-party APP may fail to obtain a camera permission of a mobile phone, and a minor may unlock a game APP with a face image of a parent without the awareness of the parent. In this application, a mobile phone determines, according to a dynamic voice token, whether a user currently playing a game is a minor, to better restrict and limit minors from playing games.

Figure 7:
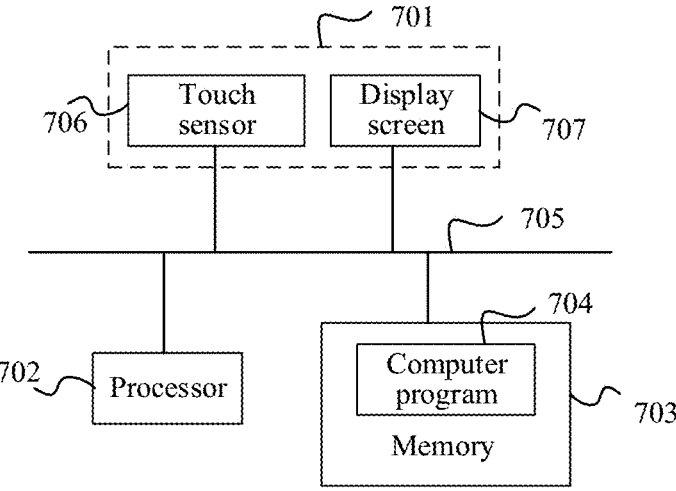
FIG. 7 is a schematic structural diagram 3 of an electronic device according to an embodiment of this application.

As shown in FIG. 7, disclosed in an embodiment of this application is an electronic device. The electronic device may be the foregoing mobile phone. The electronic device may specifically include: a touch screen 701, including a touch sensor 706 and a display screen 707; one or more processors 702; a memory 703; one or more applications (not shown); and one or more computer programs 704. The foregoing components may be connected by using one or more communication buses 705. The foregoing one or more computer programs 704 are stored in the memory 703 and configured to be executed by the one or more processors 702. The one or more computer programs 704 include instructions, and the instructions may be used to perform related steps in the foregoing embodiments.

It may be understood that to implement the foregoing functions, the electronic device or the like includes hardware structures and/or software modules for performing the various corresponding functions. A person skilled in the art should be easily aware that, in combination with the units and algorithm steps of the examples described in the embodiments disclosed in this specification, the embodiments of this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the scope of the embodiments of the present invention.

In the embodiments of this application, functional module division may be performed on the electronic device according to the examples of the methods. For example, various functional modules may be divided according to the corresponding functions, or two or more functions may be integrated into one processing module. The integrated module is implemented in the form of hardware, or is implemented in the form of a software functional module. It should be noted that in the embodiments of the present invention, the division of the modules is merely an example, and is merely division of logical functions. During actual implementation, there may be another division manner.

When function modules are obtained through division by using corresponding functions, according to a schematic diagram of possible composition of an electronic device related to the foregoing embodiments, the electronic device may include: a display unit, a transmission unit, a processing unit, and the like. It should be noted that all related content of the steps in the foregoing method embodiments may be referenced to function descriptions of corresponding functional modules. Details are not described herein again.

An embodiment of this application further provides an electronic device, including one or more processors and one or more memories. The one or more memories are coupled to the one or more processors, the one or more memories are configured to store computer program code, the computer program code includes computer instructions, and when the one or more processors execute the computer instructions, the electronic device is enabled to perform the related method steps to implement the application running method in the foregoing embodiments.

An embodiment of this application further provides a computer-readable storage medium. The computer-readable storage medium stores computer instructions, and the computer instructions, when the computer instructions are run on an electronic device, the electronic device is enabled to perform the related method steps to implement the application running method in the foregoing embodiments.

An embodiment of this application further provides a computer program product. The computer program product includes computer instructions, and the computer instructions, when the computer instructions are run on an electronic device, the electronic device is enabled to perform the related method steps to implement the application running method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the apparatus to perform the application running method performed by the electronic device in the foregoing method embodiments.

The electronic device, the computer-readable storage medium, the computer program product, or the apparatus in the embodiments may be configured to perform the corresponding method provided above. Therefore, for beneficial effects that can be achieved, refer to the beneficial effects of the corresponding method provided above. Details are not described herein again.

Through the descriptions of the foregoing implementations, a person skilled in the art may clearly understand that, for the objective of convenient and brief description, only division of the foregoing functional modules is used as an example for description. In actual application, the foregoing functions may be allocated to and completed by different functional modules according to requirements. That is, an internal structure of an apparatus is divided into different functional modules to complete all or some of the functions described above. For a specific work process of the system, apparatus and unit described above, a corresponding process in the aforementioned method embodiments may be referred to, and the details are not described herein again.

In functional units in the embodiments of this application can be integrated into one processing unit, or each of the units can exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An application running method, applicable to an electronic device, the method comprising:

obtaining, by a processor of the electronic device, a token login password entered by a user in a process of starting a game application (APP), wherein the token login password is token information preset by a registered user of the game APP;

starting, by the processor, the game APP according to the token login password entered by the user, and determining, by the electronic device, whether a game play duration of the user in the game APP is greater than or equal to a duration threshold;

prompting, by the processor of the electronic device in a case that the game play duration is greater than or equal to the duration threshold, the user to enter a first voice token, wherein the first voice token is randomly generated by the game APP, the prompting including displaying, by the processor of the electronic device, first prompt information on a first interface, wherein the first prompt information is used for prompting the user to enter the first voice token by voice; or prompting, by the processor of the electronic device by voice, the user to enter the first voice token; and receiving, by the processor of the electronic device, a second voice token entered by the user;

determining, by the processor of the electronic device, that the first voice token and the second voice token are the same;

determining, by the processor of the electronic device according to the second voice token, whether the user is a minor or an adult based on age information of the user in real time, wherein the determining, by the processor of the electronic device according to the second voice token, that the user is a minor comprises:

performing, by the processor of the electronic device, voiceprint recognition on the second voice token, and determining, according to a voiceprint recognition result, that the user is a minor, including:

inputting, by the processor of the electronic device, the second voice token into a trained voiceprint recognition model for voiceprint recognition, to obtain the age information of the user, wherein the voiceprint recognition model has learned a mapping relationship between speech features of a speaker and corresponding age information; and determining, according to the age information of the user, that the user is a minor;

in response to determining, by the processor of the electronic device according to the second voice token, that the user is a minor, making, by the processor of the electronic device, the game APP exit; and in response to determining, by the processor of the electronic device according to the second voice token, that the user is an adult, and determining, according to the second voice token and the token login password, that the user is a registered user starting the game APP, continuing, by the processor of the electronic device, to run the game APP.

2. The method according to claim 1, wherein the prompting, by the processor of the electronic device, the user to enter a first voice token comprises:

periodically or randomly prompting, by the processor of the electronic device, the user to enter the first voice token.

3. The method according to claim 1, wherein the method further comprises:

displaying, by the processor of the electronic device, the first interface after the game APP is started according to the token login password.

4. The method according to claim 1, wherein after the determining, by the processor of the electronic device according to the second voice token, that the user is a minor, the method further comprises:

displaying, by the processor of the electronic device, second prompt information, wherein the second prompt information is used for prompting the user that a running duration of the game APP has reached the duration threshold and the game APP is about to shut down.

5. The method according to claim 1, wherein the starting the game APP according to the token login password entered by the user comprises:

starting, by the processor of the electronic device, the game APP in a case that it is determined, according to the token login password entered by the user, that the user is an adult.

6. The method according to claim 1, wherein the method further comprises:

making, by the processor of the electronic device in a case that it is determined, according to the token login password entered by the user, that the user is a minor and the electronic device determines that a moment at which the user enters the token login password is outside a preset time period, the game APP exit.

7. The method according to claim 1, wherein after the determining, by the processor of the electronic device according to the second voice token, that the user is an adult, and determining, according to the second voice token and the token login password, that the user is a registered user starting the game APP, the method further comprises:

measuring, by the processor of the electronic device, the game play duration of the user in the game APP again.

8. The method according to claim 1, wherein the method further comprises:

making, by the processor of the electronic device in a case that the electronic device determines that the first voice token and the second voice token are different, the game APP exit.

9. The method according to claim 1, further comprising:

in response to determining, by the electronic device, that the first voice token and the second voice token are the same, continuing to run the game APP.

10. The method according to claim 1, wherein the starting the game APP according to the token login password entered by the user comprises:

starting, by the processor of the electronic device, the game APP in a case that it is determined, according to the token login password entered by the user, that the user is a minor and the electronic device determines that a moment at which the user enters the token login password is within a preset time period.

11. An electronic device, comprising:

one or more processors; and a memory, wherein the memory stores one or more computer programs, the one or more computer programs comprise instructions, and the instructions, when executed by the electronic device, cause the electronic device to perform:

obtaining a token login password entered by a user in a process of starting a game application (APP), wherein the token login password is token information preset by a registered user of the game APP;

starting the game APP according to the token login password entered by the user, and determining whether a game play duration of the user in the game APP is greater than or equal to a duration threshold;

prompting the user to enter a first voice token, in a case that the game play duration is greater than or equal to the duration threshold, wherein the first voice token is randomly generated by the game APP, the prompting including:

displaying first prompt information on a first interface, wherein the first prompt information is used for prompting the user to enter the first voice token by voice; or prompting, by the electronic device by voice, the user to enter the first voice token; and receiving a second voice token entered by the user;

determining that the first voice token and the second voice token are the same;

determining, according to the second voice token, whether the user is a minor or an adult based on age information of the user in real time, wherein the determining, according to the second voice token, that the user is a minor comprises:

performing voiceprint recognition on the second voice token, and determining, according to a voiceprint recognition result, that the user is a minor, including:

inputting the second voice token into a trained voiceprint recognition model for voiceprint recognition, to obtain the age information of the user, wherein the voiceprint recognition model has learned a mapping relationship between speech features of a speaker and corresponding age information; and determining, according to the age information of the user, that the user is a minor;

in response to determining, according to the second voice token, that the user is a minor, making the game APP exit; and in response to determining, according to the second voice token, that the user is an adult, and determining, according to the second voice token and the token login password, that the user is a registered user starting the game APP, continuing to run the game APP.

12. The electronic device according to claim 11, wherein the prompting the user to enter a first voice token comprises:

periodically or randomly prompting the user to enter the first voice token.

13. The electronic device according to claim 11, the instructions further cause the electronic device to perform:

displaying the first interface after the game APP is started according to the token login password.

14. The electronic device according to claim 11, after the determining, according to the second voice token, that the user is a minor, the instructions further cause the electronic device to perform:

displaying second prompt information, wherein the second prompt information is used for prompting the user that a running duration of the game APP has reached the duration threshold and the game APP is about to shut down.

15. The electronic device according to claim 11, wherein the starting the game APP according to the token login password entered by the user comprises:

starting the game APP in a case that it is determined, according to the token login password entered by the user, that the user is an adult;

or starting the game APP in a case that it is determined, according to the token login password entered by the user, that the user is a minor and the electronic device determines that a moment at which the user enters the token login password is within a preset time period.

16. The electronic device according to claim 11, the instructions further cause the electronic device to perform:

making, in a case that it is determined, according to the token login password entered by the user, that the user is a minor and the electronic device determines that a moment at which the user enters the token login password is outside a preset time period, the game APP exit.

17. The electronic device according to claim 11, the instructions further cause the electronic device to perform:

in response to determining, by the electronic device, that the first voice token and the second voice token are the same, continuing to run the game APP.

18. A computer-readable storage medium, storing instructions, wherein the instructions, when run on an electronic device, cause the electronic device to perform:

obtaining a token login password entered by a user in a process of starting a game application (APP), wherein the token login password is token information preset by a registered user of the game APP;

starting the game APP according to the token login password entered by the user, and determining whether a game play duration of the user in the game APP is greater than or equal to a duration threshold;

prompting the user to enter a first voice token, in a case that the game play duration is greater than or equal to the duration threshold, wherein the first voice token is randomly generated by the game APP, the prompting including:

displaying first prompt information on a first interface, wherein the first prompt information is used for prompting the user to enter the first voice token by voice; or prompting, by the electronic device by voice, the user to enter the first voice token; and receiving a second voice token entered by the user;

determining that the first voice token and the second voice token are the same;

determining, according to the second voice token, whether the user is a minor or an adult based on age information of the user in real time, wherein the determining, according to the second voice token, that the user is a minor comprises:

performing voiceprint recognition on the second voice token, and determining, according to a voiceprint recognition result, that the user is a minor, including:

inputting the second voice token into a trained voiceprint recognition model for voiceprint recognition, to obtain the age information of the user, wherein the voiceprint recognition model has learned a mapping relationship between speech features of a speaker and corresponding age information; and determining, according to the age information of the user, that the user is a minor;

in response to determining, according to the second voice token, that the user is a minor, making the game APP exit; and in response to determining, according to the second voice token, that the user is an adult, and determining, according to the second voice token and the token login password, that the user is a registered user starting the game APP, continuing to run the game APP.

19. The computer-readable storage medium according to claim 18, the instructions further cause the electronic device to perform:

in response to determining, by the electronic device, that the first voice token and the second voice token are the same, continuing to run the game APP.

* * * * *